United States Patent
Hicks

(10) Patent No.: US 6,375,806 B1
(45) Date of Patent: Apr. 23, 2002

(54) DESICCANT RECONCENTRATION WITH CONTROL OF POLLUTANT GASES AND VAPORS

(75) Inventor: Ralph L. Hicks, New Orleans, LA (US)

(73) Assignee: Allen Process Systems, L.L.C., New Iberia, LA (US)

( * ) Notice: Subject to any disclaimer, the term of this patent is extended or adjusted under 35 U.S.C. 154(b) by 0 days.

(21) Appl. No.: 08/318,205

(22) Filed: Oct. 5, 1994

Related U.S. Application Data

(63) Continuation of application No. 07/943,699, filed on Sep. 11, 1992, now abandoned.

(51) Int. Cl.$^7$ ................................................. B01D 3/00
(52) U.S. Cl. ........................... 203/18; 203/26; 159/47.1
(58) Field of Search .................... 203/18, 26; 159/47.1; 85/206–209

(56) References Cited

U.S. PATENT DOCUMENTS

| | | |
|---|---|---|
| 3,105,748 A | 10/1963 | Stahl |
| 3,347,019 A | 10/1967 | Barnhart |
| 3,370,636 A | 2/1968 | Francis, Jr. et al. |
| 3,450,603 A | 6/1969 | Meyers et al. |
| 3,451,897 A | 6/1969 | Welch |
| 3,616,598 A * | 11/1971 | Foral ............................ 203/18 |
| 3,736,725 A | 6/1973 | Alleman |
| 3,824,177 A | 7/1974 | Honerkamp et al. |
| 3,841,382 A | 10/1974 | Gravis, III et al. |
| 4,010,065 A | 3/1977 | Alleman |
| 4,026,681 A | 5/1977 | Roskelley |
| 4,070,231 A | 1/1978 | Alleman |
| 4,182,659 A | 1/1980 | Anwer et al. |
| 4,280,867 A | 7/1981 | Hodgson |

(List continued on next page.)

OTHER PUBLICATIONS

Steve Worley (Black, Sivalls & Bryson, Incorporated, Oklahoma City, Oklahoma), Super–Dehydration with Glycols, undated, pp. H–1 to H–8 and Figs. 1–11 (See IDS, prior to filing date of parent application, believed to be in the 1960's).

(List continued on next page.)

Primary Examiner—Nina Bhat
(74) Attorney, Agent, or Firm—Hall, Priddy, Myers & Vande Sande

(57) ABSTRACT

Unlike standard atmospheric glycol reconcentration units with reboilers, which release into the atmosphere column overheads containing water vapor, VOCs (volatile organic compounds), $H_2S$ (hydrogen sulfide) and other gaseous (including vaporous) pollutants extracted from lean glycol, the disclosed apparatus directs the overheads to the plant fuel system, or to a thermal/catalytic oxidation system, or to a compressor which is already in service compressing low pressure lease-produced gas or to a combination of these destinations. The reboiler operating pressure is maintained in the range of about 25 to about 125 PSIA. When using a stripper, which may either be in or downstream of the reboiler, one may for example achieve a 98.5+% TEG concentration at a reboiler pressure of 75 PSIA and a temperature of 390° F., using approximately 10 SCF of stripping gas per gallon of glycol circulated. When a stripper is used, and when used stripping gas is directed to the plant fuel system or to a thermal/catalytic oxidation system or is mixed with low pressure gas for final disposition to sales, fuel or other destinations, stripping gas wastage and expense are reduced. When the column overheads are at a pressure in the above range, their delivery to a compressor which is already in service compressing low pressure lease-produced gas can be accomplished without the capital and operating cost penalties of intermediate compression of overheads. Thus, used stripping gas and/or pollutants may be readily and economically mixed with low pressure gas for final disposition to sales, fuel or other destinations.

43 Claims, 1 Drawing Sheet

U.S. PATENT DOCUMENTS

| | | | |
|---|---|---|---|
| 4,322,265 A | | 3/1982 | Wood |
| 4,434,034 A | * | 2/1984 | Padilla .................... 203/18 |
| 4,460,383 A | | 7/1984 | Valerius |
| 5,084,074 A | | 1/1992 | Beer et al. |
| 5,234,552 A | * | 8/1993 | McGrew et al. ............ 203/18 |

OTHER PUBLICATIONS

Laurance S. Reid (Laurance Reid Associates, Norman, Oklahoma), Coldfinger (R) an Exhauster for Removing Trace Quantities of Water from Clycol Solutions used for Gas Dehydration, Gas Conditioning Conference, 1975, pp. 32–42 and client list.

John Morgan Campbell, (Gas Conditioning and Processing, Norman, Oklahoma), 178 1st. ed. pp. 193, 297, 299, 300, 1968.

Arthur L. Kohl & Fred C. Riesenfeld (Gas Purification, Norman, Oklahoma), 588, 4th ed., pp. 582, 588, Houston: Gulf Pub. Co., Book Division 1985.

* cited by examiner

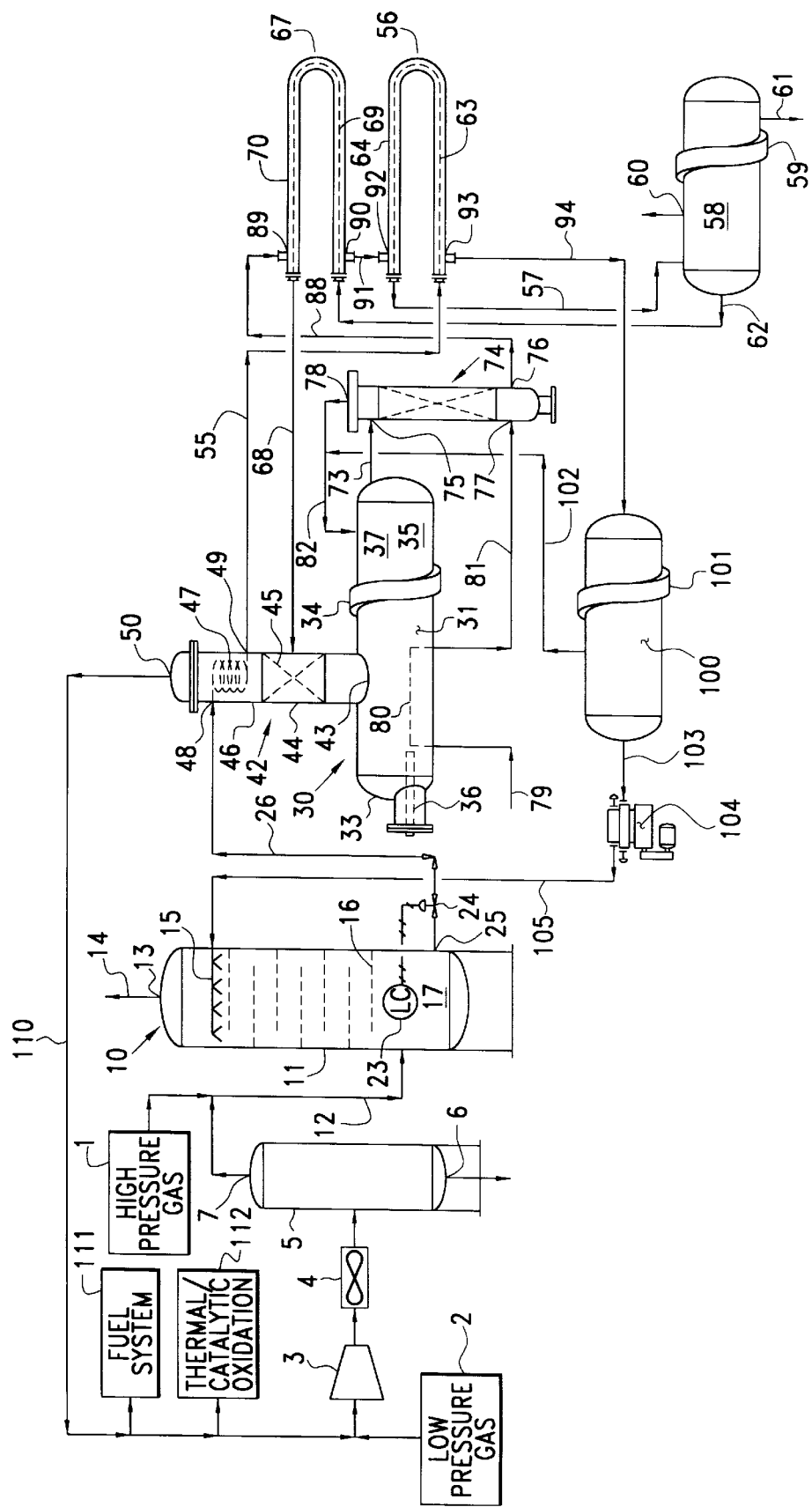

DESICCANT RECONCENTRATION WITH CONTROL OF POLLUTANT GASES AND VAPORS

This is a Continuation of application Ser. No. 07/943,699, filed Sep. 11, 1992; now abandoned.

TECHNICAL FIELD

This invention relates to reconcentration of desiccants used in dehydration of gases. More particularly, the invention relates to reconcentration of such desiccants as glycols used in the dehydration of fuel gases such as natural gas, while controlling or preventing discharge of pollutants such as VOCs (volatile organic compounds), $H_2S$ (hydrogen sulfide) gas and other gaseous (including vaporous) pollutants into the atmosphere.

BACKGROUND

Heretofore, drying fuel gases such as NG with liquid desiccants such as TEG was widely acknowledged as both acceptable and effective. Many commercial units have been constructed to practice this method.

Water absorbed from the gas by the desiccant in such installations could be removed from the "wet" desiccant in reconcentrating equipment. Thus freed of most of the water, the resulting "lean" desiccant could be recycled for use in drying additional gas.

A common type of reconcentrating device included a reboiler and an associated column having a reflux section. These components cooperated to vaporize most of the water and a relatively small proportion of the desiccant, ejecting most of the water as vapor while returning most of the desiccant to the liquid phase.

An extensive patent literature has developed concerning this mode of processing, including for example U.S. Pat. No. 3,105,748 (Stahl), U.S. Pat. No. 3,347,019 (Barnhart), U.S. Pat. No. 3,370,636 (Francis, Jr., et al), U.S. Pat. No. 3,450,603 (Meyers et al), U.S. Pat. No. 3,451,897 (Welch), 3,736,725 (Alleman), U.S. Pat. No. 3,824,177 (Honerkamp et al), U.S. Pat. No. 3,841,382 (Gravis III et al), U.S. Pat. No. 4,010,065 (Alleman), U.S. Pat. No. 4,026,681 (Roskelley), U.S. Pat. No. 4,070,231 (Alleman), U.S. Pat. No. 4,182,659 (Anwer et al), U.S. Pat. No. 4,280,867 (Hodgson), U.S. Pat. No. 4,322,265 (Wood), U.S. Pat. No. 4,460,383 (Valerius) and U.S. Pat. No. 5,084,074 (Beer et al).

TEG and other popular desiccants are subject to thermal decomposition, which occurs to a greater or lesser extent depending upon the time/temperature history of the desiccant. Decomposition, if excessive, unduly increases operating costs by requiring removal of undue amounts of tars or chars from the system while also creating a corresponding need to purchase makeup desiccant. As a consequence, reboiler operating temperature has been limited to about 400° F. or less when reconcentrating TEG.

Those practicing in this art have long known that, other factors remaining equal, desiccant decomposition can be reduced through operating at lower desiccant temperatures while maintaining the total vapor pressure in the gas spaces of the reboiler and reflux sections of the reconcentrator at relatively low levels. Thus, it was quite common to operate such equipment at sub-atmospheric or at substantially atmospheric pressure. For example, see U.S. Pat. No. 4,322,265 to Wood.

In U.S. Pat. No. 5,084,074, to exclude entry of atmospheric oxygen into their system, Beer et al suggested using a slightly positive pressure in an accumulator unit indirectly connected with their reboiler. Other workers in the art have recommended beginning the water removal at super-atmospheric pressures, but completed the removal of water in a chamber at sub-atmospheric pressure without a heating device. See for example U.S. Pat. No. 3,824,177 to Honerkamp et al and U.S. Pat. No. 4,182,659 to Anwer et al.

Customarily, the water ejected from the desiccant during its reconcentration was released into the atmosphere. Unfortunately, water vapor that was so released carried with it a variety of pollutants.

Because these pollutants are typically present in natural gas and other fuels, and because typical desiccants such as TEG and other glycols have an affinity for such pollutants, the pollutants were present in the used desiccant when the latter was processed in the above-described reboilers and their reflux sections. The character of the pollutants and of the conditions within the reconcentrating units were such that substantial amounts of these pollutants were released into the atmosphere in admixture with the water vapor.

Examples of such pollutants include the above-mentioned VOCs and $H_2S$. The VOCs are composed primarily of aromatic compounds, such as benzene, toluene an xylene, known carcinogens. ($H_2S$) is a poisonous gas. It is unfortunate that TEG, being one of the most popular desiccants for use in such processes, has a tremendous affinity for aromatics and ejects large quantities of same along with the water vapor. TEG also absorbs enough ($H_2S$) to cause similar difficulties.

In response to these difficulties, persons skilled in the art began the practice of cooling and condensing the water and pollutants released from the reflux sections of reconcentrating units. Condensed VOCs were generally pumped back into the system.

Depending on the amounts of VOCs present and the amount of cooling applied to the vapors, such cooling was not always able to recover sufficient VOCs to meet environmental standards, but, when used, increased the capital and/or operating costs of the reconcentrating unit. Moreover, such measures provided only marginal control of $H_2S$ at best, and in many cases the fuel and system characteristics were such that $H_2S$ could not be adequately controlled to meet environmental requirements.

There was also some use of vapor compressors to assist in the collection of $H_2S$ gas, non-condensed VOCs, and other non-condensed gases after discharge at atmospheric pressure or near atmospheric pressure from the reflux section. However, due to the relatively high investment and operating costs along with additional problems associated with compressors having a suction pressure at or near atmospheric pressure, this method has not proven to be popular. This method typically required investment in a compressor dedicated to the recovery of the vapors, which would otherwise not be required in the process. In addition, small deviations in the control system controlling the vapor compressor suction pressure at or near atmospheric pressure creates upsets in the dehydration process and when the deviation allows the suction pressure to drop below atmospheric pressure, air can be introduced in the system. Air, when introduced into the dehydration system causes severe corrosion and degradation of the desiccant and, in addition, creates the possible hazard of an explosive mixture being developed in the dehydration and compression system.

A rather widely used apparatus for removing the last traces of water from partially reconcentrated desiccant was a gas stripper, as described in U.S. Pat. No. 3,105,748 to Stahl. The stripper received the partially reconcentrated liquid desiccant from the reboiler and subjected it, under conditions promotive of mass transfer, to countercurrent contact with a stripping gas, usually NG, which had an affinity for water and thus absorbed water from the desiccant. The "wet" NG was then returned to the reboiler and was eventually discharged therefrom in admixture with water vapor, VOCs, $H_2S$ and possibly other gases. However, from time to time, escalating NG prices have exerted economic pressure on the use of stripping, and have supported a trend in the art toward finding ways to minimize or avoid the use of stripping gas. These included, among others, vacuum distillation, atmospheric distillation in the 425–430° F. temperature range, and azeotropic distillation.

As a result of these circumstances, a need has arisen for environmentally acceptable gas drying methods which are practical and economical. The present invention was developed to meet this need.

SUMMARY OF THE INVENTION

The invention has a number of novel and non-obvious aspects, enumerated below, which may be employed singly or in any combination with one another and/or in combination with conventional reconcentration techniques:

1. reboiler gas space is maintained at total vapor pressure of about 25 to about 125 psia
2. reflux gas space is maintained at total vapor pressure of about 25 to about 125 psia
3. overheads from reflux pass to compressor with inlet pressure of about 25 to about 125 psia (without intermediate compression by a compressor having a lower or atmospheric inlet pressure)
4. concentration level of desiccant in lean desiccant, as compared to level in wet desiccant mixture fed to reboiler (weight percent, based on weights of water and desiccant) has been increased by at least about two percent in gas stripper that is downstream of reboiler;
5. stripper, receiving liquid from reboiler, is operated with its gas space at super-atmospheric pressure;
   more preferably, stripper, receiving liquid from reboiler, is operated with its gas space at total vapor pressure of about 25 to about 125 psia
6. stripper completes reconcentration at super-atmospheric pressure, contacting partially reconcentrated desiccant with at least about 5 SCF and more preferably about 6 or about 7 (standard cubic feet) per gallon of desiccant circulated, to reconcentrate the desiccant to a desiccant content of at least about 99% (weight percent, based on weights of water and desiccant)
7. reconcentration is completed at about 25 to about 125 psia without substantial removal of water at sub-atmospheric pressure
8. entire reconcentration in reboiler, and in stripper when used, is conducted at about 25 to about 125 psia without substantial removal of water at sub-atmospheric pressure
9. stripper overheads eventually pass, directly or (preferably) after mixing with reflux overheads, to compressor with inlet pressure of about 25 to about 125 psia
10. substantially all desiccant soluble VOCs and other pollutants that were present in natural gas prior to its dehydration are:
    substantially all burned and thus not released as such to the atmosphere
    mixed with combustible gaseous fuel to produce a mixture in which the VOCs so mixed represent less than about 10 mole percent of the total mixture, and burning the resultant mixture
    mixed with combustible gaseous fuel composed predominantly of hydrocarbons other than aromatics to produce a mixture in which the aromatic content is less than about 2 mole percent of the total mixture, and burning the resultant mixture
      the combustible gaseous fuel is natural gas
        the combustible gaseous fuel is plant gas, gas burned for generating process heat within the plant facility in which reconcentration of the desiccant is conducted or within an adjacent facility
      burned in a thermal and/or catalytic oxidation process, such as in an incinerator
    burned without further compression
      introduced into burner at about 25 to about 125 psia
    fed, without intermediate compression, to a compressor having an inlet suction in the range of about 25 to about 125 psia, compressed in said compressor and then burned
      combustion occurs after VOCs have been compressed, separated from water, returned to the contactor with additional wet gas, subjected to drying treatment in the contactor, discharged from the contactor with dried gas and transmitted via pipeline to remote industrial and domestic fuel users
11. discharging VOCs directly to a compressor used to compress
    a. flash gas, and/or
    b. low pressure produced gas Other novel aspects of the invention will be apparent to those skilled in the art upon considering the teachings of the accompanying drawing and of the text which follows.

ADVANTAGES

Different embodiments of the invention may possess one or more of the following advantages. Certain particularly preferred embodiments will provide all of the following advantages.

The processes of the present invention can be conducted without discharge of VOCs to the atmosphere. The invention affords an opportunity to burn substantially all desiccant-soluble VOCs and any $H_2S$ present in natural gas prior to its dehydration. VOCs and any $H_2S$ that were present in the wet desiccant may be burned without further compression.

No environmental testing of the facility for atmospheric discharge of VOCs should be required since no VOCs will be released to the atmosphere as is oftentimes the case with conventional technology. Furthermore, discharge of VOCs from the reconcentration operation at considerably higher than normal pressures facilitates mixing and extreme dilution of VOCs in plant fuel or in fuel sold and transmitted to remote users.

As compared with prior stripping practices, reconcentration of desiccants to very low water concentrations can be accomplished without wastage of stripping gas. Thus, stripping can be used to remove trace amounts of water from partially reconstituted desiccant without a large economic penalty for stripping gas utilization, even though relatively large volumes of stripping gas are required.

Due to this invention eliminating the stripping gas wastage, stripping gas units can now be used where vacuum units would have previously been considered. As compared to reconcentrators using a vacuum, excellent reconcentration of desiccants, e.g. to 99% by weight and higher, can be obtained at low enough temperatures to very satisfactorily control decomposition without maintaining a vacuum in any part of the system. Thus, it is not necessary to employ vacuum pumps, eliminating their associated capital and operating costs and the related maintenance problems. Moreover, high levels of reconcentration can be attained with TEG at reboiler temperatures of about 400° F. and below without the use of vacuum.

When the reconcentrator has a reflux section gas space which is operated at a total vapor pressure of 25–75 psia, the water vapor, VOCs and other gaseous (including vaporous) materials present in the reflux overheads may be fed conveniently without intermediate compressors, and without their capital and operating costs, to a variety of downstream equipment. In particular, this includes equipment that will readily accept such overheads only if they are at substantially higher than normal pressure, as compared to the reflux outlet pressures of prior reconcentrators.

Examples of such receiving equipment include burners that require, for their dependable operation, that fuel be delivered to them at pressures substantially above atmospheric. Other examples include compressors installed in the plant for purposes other than compressing such reflux overheads, such as compressors required for compressing natural gas produced at low pressure, so that the gas may be charged to a dehydrating tower. These compressors may operate at an inlet pressure of 25–75 psia and thus require a like pressure in the gaseous material which is fed to them. Thus, use of the invention affords an opportunity to pass reflux overheads from the reconcentrator to such compressors without the need to provide additional step-up compressors.

Since disposition of the VOCs from the still overheads can be handled by any of the methods as described herein, the installation of equipment for the specific purpose of recovering the VOCs can be eliminated. This equipment typically includes condensers, separators, pumps, and a means for burning or incinerating the non-condensible vapors.

The larger than normal amount of stripping gas which is used in the stripping operation results in less VOCs in the condensed water vapor from the overheads since the vapor-liquid equilibrium is shifted in such a way as to minimize the condensation of the VOCs. Thus, the disposal water will contain significantly lower quantities of undesirable components. Similarly, for those systems in which the overheads are mixed with other gases, the volume ratio of the overheads to the mixing gas, such as gases for fuel and compressor suction, will be such as to achieve the same effect—less VOCs in the condensed water.

Other advantages will no doubt be apparent to those skilled in the art upon operating the process.

BRIEF DESCRIPTION OF THE DRAWINGS

The single figure is a schematic diagram of an illustrative desiccant reconcentration apparatus representing preferred and various embodiments of the invention.

VARIOUS AND PREFERRED EMBODIMENTS

The accompanying schematic diagram discloses one of numerous alternative embodiments of the invention. Thus, it is merely an illustration of how one may configure a system for drying fuel gases or non-fuel gases and for efficiently recovering waste products from the system.

The depicted embodiment is for drying fuel gases. It is generally conventional in terms of equipment design, with the exception that at least reconcentrator 30 and preferably also stripper 74 operate at a super-atmospheric pressure at which the vapors can be efficiently recycled or otherwise processed.

NG or other gas to be dried may be fed to the system from a high pressure source 1 that is of sufficient pressure to enter the drying system at the desired operating pressure. Moreover, if the source of the gas is a low pressure source 2, the stream from the low pressure source may be fed to a conventional compression system to increase the gas pressure as required to enter the drying system.

The compression system of the present embodiment includes the compressor 3 having its outlet connected with the inlet of a conventional cooler 4. This cooler has its outlet connected with knock-out vessel 5, the latter having a liquid outlet 6 and gas outlet 7. Outlet 7 and/or high pressure gas source 1 may deliver gas to the wet gas inlet conduit 12 of any suitable dehydrator, which in this case is desiccant/gas contactor 10.

Wet gas inlet conduit communicates with the interior of vessel 11 of contactor 10, which also has a dry gas outlet 13 connected with a fuel conduit 14 for conducting the dried fuel gas product to a point of use or sale, such as a long distance gas transmission system, serving remote domestic and/or industrial users located many miles from the dehydrator.

Drying is accomplished by flowing the gas upward in vessel 11 through a counter-current flow of "lean" desiccant liquid, that which is of sufficiently high concentration of desiccant to be useful in absorbing water and/or other materials from the gas. Lean desiccant enters contactor vessel 11 through desiccant shower 15 and flows downward, mingling intimately with the rising gas as both gas and desiccant pass through the trays or packing 16. In the bottom of vessel 11 is a reservoir 17 for receiving "rich" desiccant, which has absorbed compounds intended to be removed from the gas, such as water, VOCs, $H_2S$ and other compounds.

Reservoir 17 includes a rich desiccant outlet 25 and a level controller 23 for operating control valve 24. This valve controls the flow of rich desiccant through the rich desiccant transfer line 26 to the reconcentrator 30.

The desiccant/gas contacting system 10 can alternately be a drying system that employs chilling the gas and condensing the resulting water vapor. In this case the lean desiccant is injected upstream of the chilling system and the rich desiccant containing condensed liquids is recovered downstream of the chilling system and directed to the reconcentrator 30 and reconcentrated in the manner described below.

Reconcentrator system 30 comprises a reboiler section 31 which includes a vessel 33 incorporating a heat source 36 submerged in a pool of vaporizing desiccant in the lower portion 35 of the vessel with the upper portion 37 of the vessel containing a vapor space. Attached to the reboiler section 31 is the rectification section 32 which includes a column 42 including the column inlet 43, a still section 44 including packing or trays 45, a reflux section 46 with a reflux coil 47, reflux coil inlet 48, reflux coil outlet 49, and a vapor outlet 50.

Inlet 48 is connected with transfer line 26 to receive rich desiccant from desiccant/gas contacting system 10. A flow of relatively cool rich desiccant through reflux coil 47 provides cooling for the reflux section 46 and heats the desiccant. Reflux coil outlet 49 communicates through the supply conduit 55 with heat exchangers and a flash drum.

The heat exchangers, which may be of any suitable design, are for transferring heat from "hot" lean desiccant to the "cold" rich desiccant. Included is the "cold" desiccant heat exchanger 56 which is connected with reflux coil 47 through the supply conduit 55 to receive "cold" rich desiccant. Heat exchanger 56 includes a path in which such desiccant can flow and be heated in a manner to be further described in a succeeding paragraph. This path communicates with discharge conduit 57 and the interior of flash chamber 58 which includes thermal insulation 59, a vapor outlet 60, and a liquid hydrocarbon discharge 61.

A discharge line 62 is provided to accept desiccant from the flash chamber 58 and to direct the desiccant to the "hot" desiccant heat exchanger 67. Like heat exchanger 56, heat exchanger 67 includes a path in which such desiccant can flow and be heated in a manner to be further described in a succeeding paragraph. This path communicates with return conduit 68, which communicates with and supplies rich desiccant to packing or trays 45 in the still section 44 of column 42.

Liquid desiccant released from the bottom of packing or trays 16 passes through the column vapor inlet 43 can drop into reboiler vessel 33 to continuously replenish the above-mentioned pool of vaporizing desiccant and other materials in the lower portion 35 of the vessel. The upward flow of desiccant vapors, water vapor, VOCs, $H_2S$, and other vapors and gases emanating from the pool can pass upward through vapor inlet 43 into column 42. The column, the packing or trays 45 and the reflux coil 47 are arranged to condense most of the desiccant and return it to the pool as liquid, while discharging the remaining vapors through overhead vapor outlet 50.

Also, reconcentrator system 30 preferably includes a stripper 74. This may be any separation chamber which contains packing, trays and/or other mass-transfer promoting means and which has means for causing co-current or preferably counter-current flow of stripping gas and partially reconcentrated desiccant and for separate recovery of wet gas and reconcentrated desiccant. The stripper preferably also includes means to supply at least a substantial portion, preferably at least most, and still more preferably substantially all, of the heat of vaporization of the materials vaporized therein.

Stripper 74 may be attached to the reboiler vessel 33 by means of partially reconcentrated desiccant discharge line 73 and a vapor return line 82. The stripper includes desiccant inlet 75 and outlet 76 as well as stripping gas inlet 77 and outlet 78. Stripping gas source 79, connected with inlet 77 through a heating coil 80 in reboiler 31 and gas supply line 81, supplies preheated stripping gas to the stripper.

Stripping may however be conducted in the reboiler. For example, stripping gas jets (not shown) may be positioned along a supply conduit (not shown) in the bottom of reboiler 31. In such case a stripper 76 may or may not be included in the system.

The stripper 74, when present, is arranged to discharge hot lean desiccant through its desiccant outlet 76. Optionally, or preferably, especially when pressure in the stripper, reflux section and reboiler gas space are in the upper portion of their operating ranges, or when maximum reconcentration of desiccant is desired, the outlet may be connected to a second stripper (not shown) in series with and generally similar to stripper 74, for further reconcentration of the desiccant. This second stripper, referred to as a polishing stripper, need not be operated at the same pressure as stripper 74, and may for example be operated at a lower pressure. When present, it may be arranged to discharge lean desiccant into hot desiccant transfer line 88.

It is contemplated however that in most circumstances the stripper 76 or a stripping arrangement in the reboiler, as described above, will be sufficient. Thus, in most embodiments of the invention, lean desiccant will be introduced into hot desiccant transfer line 88 direct from the reboiler vessel 33 (which arrangement is not shown in the drawing) or will be discharged into transfer line 88 from stripper outlet 76 as shown.

Transfer line 88 provides a passageway which may conduct hot lean desiccant from the reboiler, from the stripper 74 or from the polishing stripper to the "hot" desiccant heat exchanger 67 through its jacket inlet 89. Exchanger 67 is configured to provide heat transfer between the hot lean desiccant and the cold rich desiccant moving along the above-mentioned path, and to discharge the partly cooled but still rather hot lean desiccant through jacket outlet 90 and pipe 91 into the "cold" desiccant heat exchanger through the jacket inlet 92. Like exchanger 67, exchanger 56 is configured to provide heat transfer between the lean desiccant and the cold rich desiccant moving along the above-mentioned path which traverses exchanger 56, and to discharge the further cooled lean desiccant through jacket outlet 93.

Cooled desiccant flows through cooled desiccant conduit 94 to surge tank 100 which includes thermal insulation 101 and is connected to reboiler section 31 through pressure equalization line 102 and to a desiccant pump 104 by means of a pump supply line 103. The pump 104 directs the lean desiccant back to the desiccant/gas contacting system 10 by means of the desiccant recycle line 105. The function of pump 104 may be performed by any suitable liquid transport device, including pumps of other designs than that shown. For example, gas-powered pumps may be employed. If a Kimray pump is used, the customary connections would be made in the rich and lean desiccant lines, and level control 23 and valve 24 would no longer be needed.

Overhead vapors discharged through outlet 50 of reconcentrator column 42 flow by means of the still column overheads line 110 to, preferably, either or a combination of the suction of the compressor 3, the plant fuel system 111, or a thermal/catalytic oxidation system 112. It should be understood therefore that one or more of the connections between line 110 and components 3, 111 and 112 may thus be eliminated. Moreover, connections between line 110 and other devices for receiving and consuming or otherwise using or disposing of the still column overheads may be added to or substituted for those shown. However, connection of the inlet of compressor 3 to the overheads outlet 50 of the reflux section of the reconcentrator indirectly or directly, such as through the still column overheads line 110, is a particularly preferred embodiment of the invention.

When the compressor is present and is connected as described above, most of the VOCs may be directed into desiccant/gas contactor 10 and may be discharged therefrom in admixture with the dehydrated fuel gas via dry gas outlet 13 and fuel conduit 14, through which the desiccant/gas contactor 10 may be connected with an overland gas transmission pipeline for delivering the fuel, containing a relatively dilute mixture of VOCs to remote industrial and domestic fuel users for burning. If there is a need to recover relatively small amounts of VOCs from the liquids discharged from the liquid outlet 6 of knockout vessel 5, such outlet may be connected to any suitable means for disposing of such liquids (not shown). For example, one may employ a "water skimmer" (not shown) having a vessel which functions to separate small quantities of hydrocarbons from the entering bulk water stream. A hydrocarbon discharge outlet of the skimmer may be connected via a suitable pump to transport separated hydrocarbon liquids to a low pressure separator which can recover them as saleable product. An additional outlet from the skimmer, for water, may be connected to appropriate means for further treating the separated water to render it environmentally safe for local discharge. Such an arrangement is capable of nearly total containment of the VOCs exiting the reboiler.

In FIG. 1, the sources of gas to be dehydrated are comprised of gas that of itself has sufficient pressure to enter the sales line, which may have varying pressures from about 200–1700 psia; lower pressure wells and/or flash gas, that was formed by depressuring condensate or oil as is commonly done in reducing the pressure to allow storage in tanks, requiring compression by some type mechanical device from about 25 to 100 psia; or a combination of the two streams as is depicted. Note that, in some schemes, the gas contactor can be used to dehydrate lower pressure sources before compression such as is oftentimes done for $CO_2$ dehydration.

Preferably, the wet gas enters at the bottom with the lean glycol entering at the top to allow for a counter-current flow. However, though not as efficient, a concurrent flow arrangement could be used. As the mixing and contacting between the desiccant and the gas takes place, the desiccant becomes richer in water, aromatic compounds and other potentially objectionable components such as hydrogen sulphide.

The most commonly used desiccants have been the glycols, primarily diethylene and triethylene, with triethylene glycol (TEG) being the most prominent due to its much greater water absorbing capability which allows for lower outlet gas water contents or dehydration of gas that has much water in the inlet to the contactor such as in higher temperature systems (>110° F.). Unfortunately, for the same reason that the glycols are excellent water absorbers, they also have a tremendous affinity for the aromatic hydrocarbons, such as benzene, and, if present, carbon dioxide and hydrogen sulfide. This causes serious environmental problems since benzene is a known carcinogen and hydrogen sulfide is a poisonous gas.

An important part of the design of a glycol system is to determine the amount of desiccant to be circulated. This will depend on the contactor temperature and pressure, the number of equilibrium contacts in the contactor, as well as the purity of the desiccant (the lesser water in the lean desiccant then the greater the ability to absorb water vapor). For given contactor conditions, the leanness of the desiccant is the most important variable. For most TEG units for example, the preferable purity of glycol is 98.5% (375° F. TEG at atmospheric pressure) to 99.99% (much stripping gas), depending on the required dewpoint depression (inlet gas dewpoint versus outlet).

To allow the desiccant to be reused, these compounds are removed in a reconcentrator. This reconcentrator is a simple distillation column with a reflux section, a rectifying section and a reboiling section. The reboiler temperature varies with the type desiccant, a typical temperature being about 350–400° F. for TEG for example with the upper limit being imposed due to the degradation of the desiccant. With this invention, the temperature can remain the same and can even tend toward the lower range to allow for less desiccant degradation, since the amount of stripping gas can be increased with its being recovered and not lost.

Prior to this invention, most systems were designed to operate at atmospheric pressure or at vacuum. The reboiler pressure can range from about 25 psia to about 125 psia, depending on the disposition of the still column overheads, with a preferable range of about 25 psia to about 75 psia. Of course, the lower pressures will reduce the amount of stripping gas. Depending on the reboiler pressure and amount of stripping gas, the temperature at the top of the column (reflux section) will range from about 200° F. to 275° F.

The vapor exiting the Reboiler Still Column is composed of water and hydrocarbon (VOC) saturated vapor of varied proportions depending on the composition of the wet high pressure gas and operating conditions of the overall dehydration system. In the proposed system these mixed vapors are delivered to either a Fuel System—111, Thermal/Catalytic Oxidation—112 or compressed for combination with the High Pressure Gas Stream—1 entering the Contactor—10. Upon Compression—3 and Cooling—4, a portion of the water and hydrocarbon vapors condense into liquids and are discharged from the Knockout Vessel—5 via Stream No. 6.

The liquids, consisting of condensed hydrocarbons (VOCs) and water in various proportions, may be sent to various other processing systems. Typically, in oil and gas production facilities, compressor knockout vessel liquids are sent to a vessel designated as a "Water Skimmer" which functions to separate small quantities of hydrocarbons from the entering bulk water stream. The separated hydrocarbon liquids are recovered as saleable product by pumping them to upstream primary separation equipment such as a Low Pressure Separator. The separated water is sent to further treatment to render it environmentally safe for local discharge. Any vapors from the Water Skimmer are combined with the vapor stream from the Reboiler Still Column—110. The net result is nearly total containment of the VOCs exiting the Glycol Reboiler.

The operation of the stripper 74 has been saved for last since it is a critical component of this invention. The use of the stripper column was devised by Stahl in the late 1950s and patented in 1963. Prior art has used the stripper column in similar fashion to that shown in FIG. 1 to allow higher reconcentrations of desiccants than possible with heat alone. For example, triethylene glycol can be reconstituted to 99.95%+ desiccant with this device at atmospheric pressure and 400° F. reconcentrator temperature. This allows for very low dewpoint depressions at the expense of extra cost for the stripping gas that is normally lost.

Since emission control of hydrocarbons from reconcentrators such as that shown in FIG. 1 are now required by some states, many methods for recovering the overheads have been developed. These recovery methods typically involve condensing some or most of the overheads and burning the non-condensibles in the reconcentrator or in a flare/incinerator system; educting the overheads with a fuel gas or other vapor; or compressing the vapors with a compressor designed to operate at minimal suction pressure. All of the known methods suggest that it is important to minimize the pressure in the recovery process thereby achieving reconcentration at as near atmospheric pressure as possible to allow for the maximum attainable desiccant concentrations. This invention eliminates the need for the extra components by allowing the reconcentrator to operate under pressure in ranges as previously discussed. At these elevated pressures, the disposition of the overhead vapors is much simpler since they can be simply recompressed in 3, used for fuel in 111 or incinerated in 112. Since more stripping gas is required at the elevated pressures, recompression and use for fuel are the most desirable of the alternatives, although incineration can be cost effective if other compounds have to be burned since the stripping gas can serve as the necessary fuel for incineration.

At the elevated pressures in this invention, the desiccant exiting the reconcentrator still contains much water and even some aromatics, since as mentioned the maximum temperature of the desiccant is limited by degradation temperatures. Thus, considerably more of the water has to be removed in the stripper than in all previous art. As a matter of fact, depending on the desiccant circulation rate with respect to the water vapor removed (gallons of desiccant per pound of water removed), there are many cases wherein all of the actual vapor will be removed in the stripper column. Therefore, the stripping column height has to be increased considerably more than can be inferred from the Stahl recommendations. Furthermore, due to the temperature reduction in the stripper from the vaporizing water (heat of vaporization), it is also important that the stripping gas be preheated sufficiently, such as shown by the preheat coils 80 to as close to the reboiler temperature as is practical (about 10 to 20° F.).

With the modifications as suggested herein, examples of attainable triethylene glycol concentrations under pressure are approximately 99.8% with a pressure of 25 psia and a stripping gas rate of 10 standard cubic feet of per gallon of glycol and approximately 98.9% with a pressure of 75 psia and a rate of 15 standard cubic feet per gallon. These values are for a reconcentrator temperature of 390° F. with two theoretical trays in the stripper or approximately 5–8 feet of dumped packing, such as Berl saddles or Pall rings.

Other embodiments of this invention can be easily conceived, such as the use of a "polishing stripper" after the reconcentration system as envisioned in FIG. 1. With the invention as herein described, the emissions are recovered in the reboiler/stripper overheads. This polishing stripper could operate at atmospheric pressure, as in the existing state of the art systems. This would allow reconcentration of triethylene glycol, for example, to 99.95%+ for the extra tough dehydration requirements with no more stripping gas than is currently required. Also, the desiccant to the polishing stripper could be preheated to allow better reconcentration of the desiccant with less stripping gas.

Another simple and possibly useful modification would connect the flash chamber vent gas 60 to the stripping gas inlet 79. This would be particularly useful if gas powered pumps were being used, such as the Kimray, since, for example, at contactor pressure of 1000 psia, the Kimrays require approximately 6 standard cubic feet per gallon of glycol for their motive force. The flash gas could be supplemented with fuel gas to obtain the proper amount of stripping gas, depending, of course, on the reconcentrator temperature and pressure.

EXAMPLE 50 million cubic feet per day of saturated natural gas is dehydrated as follows at 1015 psia and 100° F. in an eight tray contactor tower to a specification requiring the gas to contain less then 7 pounds of water per million cubic feet of gas:

|  | INLET CONDITION | OUTLET CONDITION |
|---|---|---|
| Pressure | 1015 psia | 1012 psia |
| Temperature | 100° F. | 103° F. |
| Sp. Gr. | .65 | .65 |
| Water Content | 3050 lbs/day | 350 lbs/day |

Water to be removed 2700 lbs/day

Tower tray design requires that 2.5 gallons of triethylene glycol be circulated per pound of water removed, thereby resulting in a total glycol circulation of 6750 gallons per day. With a tray efficiency of 30%, a lean glycol concentration of 98.5% will easily allow meeting the outlet gas water content specification.

The existing gas analysis shows the presence of approximately 0.5 mole percent aromatics and computer simulations show that the rich glycol will contain substantially more VOCs (primarily aromatics) than allowed by regulatory authorities. These simulations also show that most of the VOCs will remain in the glycol even after the flash chamber (typical of most systems). Thus, the still column overheads will have to be recovered.

The reconcentration unit is a standard 500,000 BTU unit with approximately 60% of the BTU requirements being furnished by a natural draft firetube with an efficiency of 55% and the remaining 40% being recovered in the glycol/glycol heat exchangers. Fuel required is approximately 550 cubic feet per hour.

In a standard atmospheric glycol unit, all the VOCs are released to the atmosphere along with the 2700 pounds of water vapor. However, in this system, the overheads can flow to the suction of a 3 stage compressor which is already in service compressing low pressure lease produced gas. The compressor suction pressure is 65 psia and its discharge pressure is 1015 psia. Therefore, the operating pressure of the reboiler is about 75 psia to allow for a 10 psia pressure drop in the lines leading to the compressor. To achieve the desired 98.5% TEG concentration at a pressure of 75 psia and a reboiler temperature of 390° F., approximately 10 standard cubic feet of stripping gas are required per gallon of glycol circulated, or 67,000 scf per day.

In this arrangement, according to this invention, no water vapors, flash gas or VOCs are allowed to reach the atmosphere. The overhead from the reconcentrator contains the 2700 pounds of water vapor and 67,000 scf per day of stripping gas. The stripping gas and VOCs are mixed with the low pressure gas source for final disposition to sales, fuel or other destinations. At saturation conditions, the 1015 psia compressor discharge gas can only contain 61 pounds of water per million. Therefore, the now compressed stripping gas can only contain approximately 4 lbs. of water. This means that, between the 75 psia and 1015 psia conditions, 2696 pounds of water is condensed. This water will be in equilibrium with all the compressed vapors as opposed to the VOCs only as is the case with conventional recovery units. This, therefore, reduces the amount of VOCs absorbed in the water. The water is then mixed with the remainder of the produced water for disposal.

In summary, the overheads are mixed with the inlet gas to the compressor, the gas from the compressor is reintroduced into the gas stream prior to dehydration, and no VOCs are released to the atmosphere from the reboiler overheads. Also, no extra equipment is necessary, e.g., low pressure compression, condensers, separator or pumps.

What is claimed is:

1. A method of drying fuel gas containing water vapor and at least one pollutant comprising at least one member of the group consisting of volatile organic compounds, hydrogen sulfide and other gaseous pollutants, said method comprising:
   A. bringing said fuel gas into contact, in a gas/liquid contact vessel, with a liquid desiccant having an affinity for said water vapor and pollutant, thereby transferring water vapor and pollutant from said fuel gas into said desiccant;
   B. reconcentrating resultant rich desiccant containing water and pollutant by introducing said desiccant into a reconcentration system comprising a reboiler having a heating vessel, liquid and gas spaces in said heating vessel, a liquid outlet from said liquid space, and a column having a gas and/or vapor transmitting connection between said heating vessel gas space and said column and a vapor outlet for discharging gas and/or vapor from said column;
   C. maintaining a total pressure of at least about 25 PSIA in said heating vessel gas space while expelling pollutant from rich desiccant in said heating vessel and into said column; and
   D. discharging gaseous pollutant through said column vapor outlet, while preventing discharge of said gaseous pollutant from said reconcentration system into the atmosphere and recovering reconcentrated desiccant.

2. A method of drying fuel gas according to claim 1 which includes providing a column having a gas space therein and maintaining a total pressure of at least about 25 PSIA in the column gas space.

3. A method of drying fuel gas according to claim 1 which includes completing reconcentration under total pressure in the range about 25 to about 125 PSIA, without substantial removal of water at sub-atmospheric pressure.

4. A method of drying fuel gas according to claim 1 which includes conducting the entire reconcentration under total pressure in the range of about 25 to about 125 PSIA and without substantial removal of water at sub-atmospheric pressure.

5. A method of drying fuel gas according to claim 1 which includes passing overheads from the vapor outlet of the column to a compressor, the inlet pressure of which is in the range of about 25 to about 125 PSIA, without intermediate compression by a compressor having a lower inlet pressure.

6. A method of drying fuel gas according to claim 1 which includes stripping desiccant in a stripper or other vessel to increase the concentration level of desiccant in the reconcentrated desiccant.

7. A method of drying fuel gas according to claim 6 which includes stripping desiccant, after it has been discharged from the reboiler, in a stripper that is downstream of the reboiler and increasing the concentration level of the desiccant in such stripper by at least about two weight percent, based on the weights of water and desiccant in the rich desiccant mixture fed to the reboiler.

8. A method of drying fuel gas according to claim 7 which includes stripping in a stripper having a gas space and maintaining the total pressure in said stripper gas space above atmospheric pressure.

9. A method of drying fuel gas according to claim 7 which includes stripping in a stripper having a gas space and maintaining thet total pressure in said stripper gas space in the range of about 25 to about 125 PSIA.

10. A method of drying fuel gas according to claim 7 which includes completing reconcentration of the desiccant at super-atmospheric pressure.

11. A method of drying fuel gas according to claim 6 including stripping partially reconcentrated desiccant with at least about 5 SCF of stripping gas per gallon of desiccant circulated, to reconcentrate the desiccant to a desiccant content of at least about 99 weight percent, based on weights of water and desiccant.

12. A method of drying fuel gas according to claim 6 including stripping partially reconcentrated desiccant with at least about 6 SCF of stripping gas per gallon of desiccant circulated, to reconcentrate the desiccant to a desiccant content of at least about 99 weight percent, based on weights of water and desiccant.

13. A method of drying fuel gas according to claim 6 including stripping partially reconcentrated desiccant with at least about 7 SCF of stripping gas per gallon of desiccant circulated, to reconcentrate the desiccant to a desiccant content of at least about 99 weight percent, based on weights of water and desiccant.

14. A method of drying fuel gas according to claim 6 which includes stripping in a vessel having a gas space and maintaining the total pressure in said vessel gas space above atmospheric pressure.

15. A method of drying fuel gas according to claim 6 which includes stripping in a vessel having a gas space and maintaining the total pressure in said vessel gas space in the range of about 25 to about 125 PSIA.

16. A method of drying fuel gas according to claim 6 which includes completing reconcentration of the desiccant at super-atmospheric pressure.

17. A method of drying fuel gas according to claim 6 which includes completing reconcentration under total pressure in the range about 25 to about 125 PSIA without substantial removal of water at sub-atmospheric pressure.

18. A method of drying fuel gas according to claim 6 wherein the entire reconcentration is conducted at a total pressure in the range of about 25 to about 125 PSIA, without substantial removal of water at sub-atmospheric pressure.

19. A method of drying fuel gas according to claim 6 which includes passing stripped vapors to a compressor, the inlet pressure of which is in the range of about 25 to about 125 PSIA, without intermediate compression by a compressor having a lower inlet pressure.

20. A method of drying fuel gas according to claim 6 which includes mixing stripped vapors with column overheads and passing the resultant mixture to a compressor, the inlet pressure of which is in the range of about 25 to about 125 PSIA, without intermediate compression by a compressor having a lower inlet pressure.

21. A method according to claim 6 further comprising a reflux portion for assisting in condensing said desiccant out of said gas and/or vapor.

22. A method of drying fuel gas according to claim 1, including discharging volatile organic compounds from said column and passing said volatile organic compounds, without intermediate compression, to a compressor for compression in admixture with flash gas and/or with low pressure produced gas.

23. A method of drying fuel gas according to claim 1 in which substantially all desiccant soluble volatile organic compounds and other pollutants that were present in the fuel gas prior to its dehydration are burned, after their recovery from desiccant, so that they are not released as such to the atmosphere.

24. A method of drying fuel gas according to claim 23 which includes mixing said desiccant soluble volatile organic compounds, after their recovery from desiccant, with combustible gaseous fuel to produce a mixture in which the desiccant soluble volatile organic compounds represent less than about 10 mole percent of the total mixture, and burning said mixture.

25. A method of drying fuel gas according to claim 24 in which the combustible gaseous fuel is natural gas.

26. A method of drying fuel gas according to claim 24 in which the combustible gaseous fuel is plant gas which is burned for generating process heat within the plant facility in which reconcentration of the desiccant is conducted or within an adjacent facility.

27. A method of drying fuel gas according to claim 23 which includes mixing said desiccant soluble volatile organic compounds and other pollutants, after their recovery from desiccant, with combustible gaseous fuel to form a mixture in which the aromatic content is less than about 2 mole percent of the total mixture, and burning said mixture.

28. A method of drying fuel gas according to claim 27 in which the combustible gaseous fuel is natural gas.

29. A method of drying fuel gas according to claim 27 in which the combustible gaseous fuel is plant gas which is burned for generating process heat within the plant facility in which reconcentration of the desiccant is conducted or within an adjacent facility.

30. A method of drying fuel gas according to claim 1 in which substantially all desiccant soluble volatile organic compounds and other pollutants that were present in the fuel gas prior to its dehydration are burned, after their recovery from desiccant, without further compression.

31. A method of drying fuel gas according to claim 30 which the burning of the desiccant soluble volatile organic compounds and other pollutants is performed in a burner into which said pollutants are introduced under pressure in the range of about 25 to about 125 PSIA.

32. A method of drying fuel gas according to claim 1 in which substantially all desiccant soluble volatile organic compounds and other pollutants that were present in the fuel gas prior to its dehydration are fed, after their recovery from desiccant and without intermediate compression, to a compressor with inlet suction in the range of about 25 to about 125 PSIA, are compressed in said compressor and are then burned.

33. A method of drying fuel gas according to claim 32 in which, following said compression, the desiccant soluble volatile organic compounds and other pollutants are separated from water, are returned to the contact vessel with additional wet fuel gas, are subjected to drying treatment in the contact vessel, are discharged from the contact vessel with dried gas and transmitted via pipeline to remote industrial and domestic fuel users for burning.

34. A method of drying fuel gas containing water vapor and at least one pollutant comprising at least one member selected from the group consisting of volatile organic compounds, hydrogen sulfide and other gaseous pollutants, said method comprising:

A. bringing said fuel gas into contact, in a gas/liquid contact vessel, with a liquid desiccant having an affinity for said water vapor and pollutant, thereby transferring water vapor and pollutant from said fuel gas into said desiccant;

B. introducing resultant rich desiccant containing water and pollutant into a reconcentration system comprising a reboiler having a heating vessel, liquid and gas spaces in said heating vessel, a liquid outlet from said liquid space, a column in communication with said heating vessel gas space, a column gas space within said column and a vapor outlet for discharging gas and/or vapor from said column gas space;

C. maintaining total pressure in the range of about 25 to about 125 PSIA in the gas spaces of said heating vessel and said column while expelling pollutant from rich desiccant in said heating vessel and into said column;

D. transferring partially reconcentrated liquid desiccant from said reboiler liquid outlet to a stripper having a gas space, mass-transfer promoting media and a liquid heater;

E. maintaining total pressure in said stripper gas space in the range of about 25 to about 125 PSIA, while causing co-current or counter-current flow of stripping gas and partially reconcentrated desiccant through said mass-transfer promoting media;

F. in the stripper, stripping partially reconcentrated desiccant with at least about 5 SCF of said stripping gas per gallon of desiccant circulated, vaporizing water vapor and at least one of said pollutants into the stripping gas and supplying to the desiccant with the heater at least most of the heat of vaporization of the materials so vaporized;

G. in the stripper, raising the concentration level of said desiccant by at least about two weight percent, based on the weights of water and desiccant in the rich desiccant mixture fed to the reboiler;

H. recovering reconcentrated desiccant;

I. conveying used stripping gas, containing water vapor and gaseous pollutant, from said stripper to said column, discharging said water vapor and gaseous pollutant through said column vapor outlet and introducing the water vapor and gaseous pollutant without intermediate compression in a compressor, into at least one member of the group consisting of
  1. a burner,
  2. a thermal/catalytic oxidation system, and
  3. a compressor, the inlet pressure of which is in the range of about 25 to about 125 PSIA, while preventing discharge of said gaseous pollutant from said reconcentration system into the atmosphere.

35. A method of drying fuel gas according to claim 34 in which the fuel gas is natural gas.

36. A method of drying fuel gas according to claim 34 in which the desiccant includes at least one glycol selected from among triethylene glycol and diethylene glycol.

37. A method of drying fuel gas according to claim 34 in which the volatile organic compounds are composed primarily of aromatic compounds selected from among benzene, toluene and xylene.

38. A method of drying fuel gas according to claim 34 in which gaseous pollutant discharged from the reconcentrator is introduced, without intermediate compression, into a burner.

39. A method of drying fuel gas according to claim 34 in which gaseous pollutant discharged from the reconcentrator is introduced, without intermediate compression, into a thermal/catalytic oxidation system.

40. A method of drying fuel gas according to claim 34 in which gaseous pollutant discharged through said column vapor outlet is introduced, without intermediate compression, into a compressor with inlet suction in the range of about 25 to about 125 PSIA.

41. A method of drying fuel gas according to claim 40 in which the gaseous pollutant is compressed in said compressor, is then separated from water, is returned to the contact vessel and mixed with additional wet fuel gas, is subjected to drying treatment in the contact vessel, is discharged from the contact vessel with dried gas and is transmitted via pipeline to remote industrial and domestic fuel users for burning.

42. A method according to claim 1 further comprising a reflux portion for assisting in condensing said desiccant out of said gas and/or vapor.

43. A method of drying fuel gas containing water vapor and at least one pollutant comprising at least one member selected from the group consisting of volatile organic compounds, hydrogen sulfide and other gaseous pollutants, said method comprising:

A. bringing said fuel gas into contact, in a gas/liquid contact vessel, with a liquid desiccant having an affinity for said water vapor and pollutant, thereby transferring water vapor and pollutant from said fuel gas into said desiccant;

B. reconcentrating resultant rich desiccant containing water and pollutant by introducing said desiccant into a reconcentration system having liquid and gas space, connected heating and column portions, a liquid outlet from liquid space in said heating portion, and a vapor outlet for discharging gas and/or vapor from said column portion;

C. maintaining a total pressure of at least about 25 PSIA in said gas space while expelling pollutant from rich desiccant; and D. discharging gaseous pollutant through said column vapor outlet, while preventing discharge of said gaseous pollutant from said reconcentration system into the atmosphere and recovering reconcentrated desiccant.

* * * * *